July 7, 1959

H. A. SILVEN 2,893,171

GRINDING MACHINE

Filed Aug. 12, 1957

INVENTOR
HERBERT A. SILVEN
BY
Harold W. Eaton
ATTORNEY

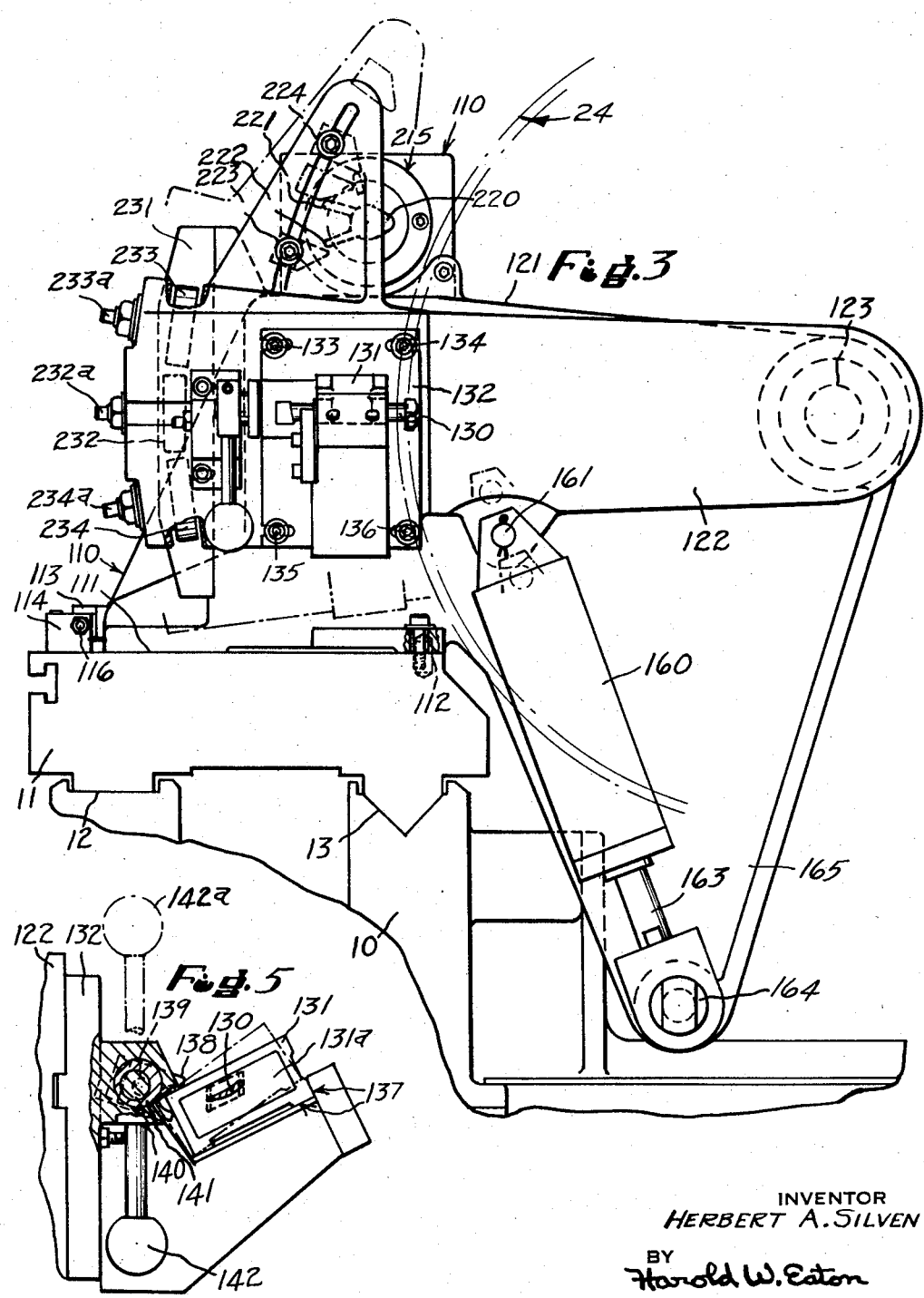

July 7, 1959     H. A. SILVEN     2,893,171
GRINDING MACHINE
Filed Aug. 12, 1957                     4 Sheets-Sheet 3
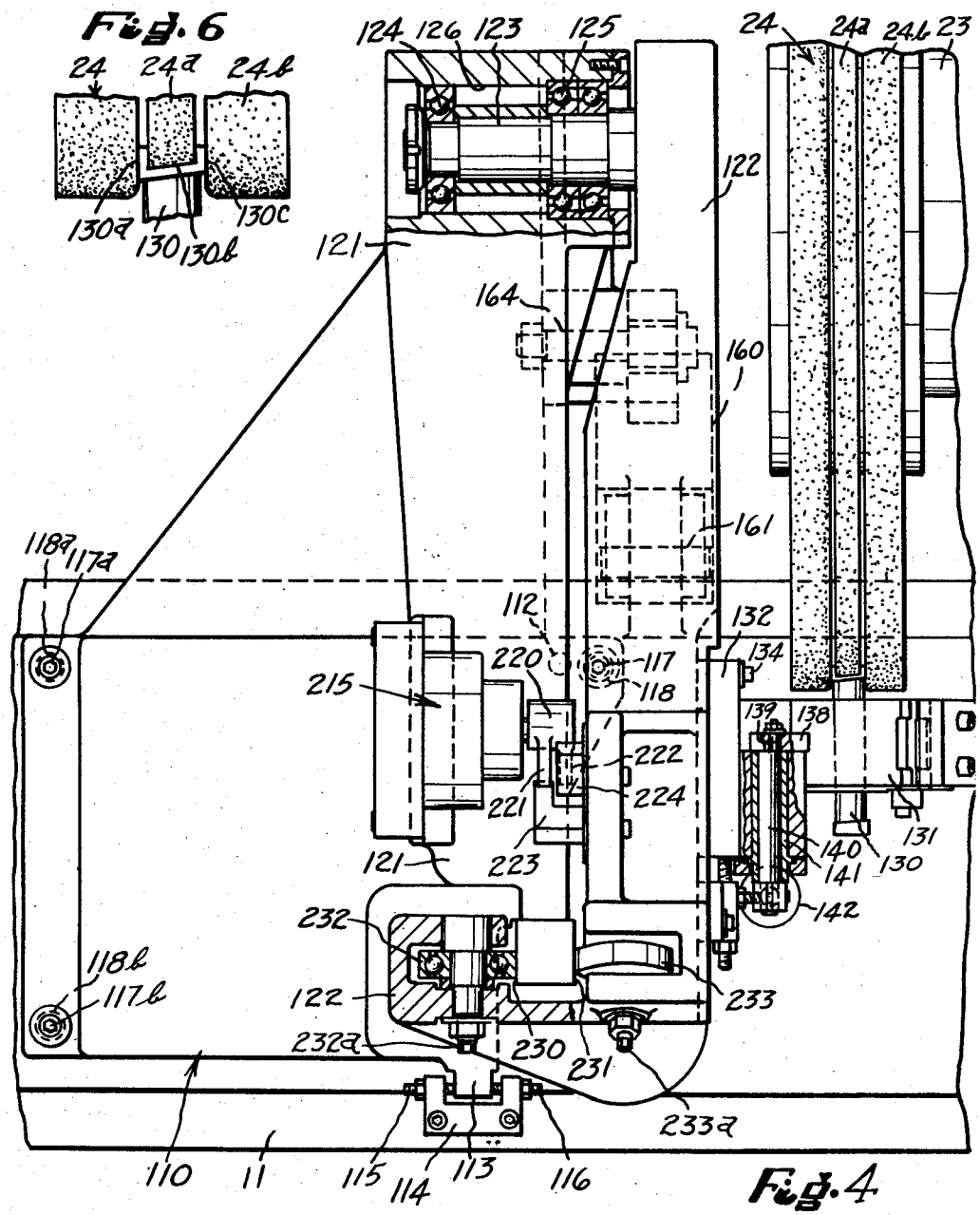
INVENTOR
HERBERT A. SILVEN
BY
Harold W. Eaton
ATTORNEY July 7, 1959

H. A. SILVEN 2,893,171

GRINDING MACHINE

Filed Aug. 12, 1957

INVENTOR
HERBERT A. SILVEN
BY
Harold W. Eaton
ATTORNEY

United States Patent Office 2,893,171
Patented July 7, 1959

2,893,171

GRINDING MACHINE

Herbert A. Silven, West Boylston, Mass., assignor to Norton Company, Worcester, Mass., a corporation of Massachusetts Application August 12, 1957, Serial No. 677,569

7 Claims. (Cl. 51—3)

The invention relates to grinding machines, and more particularly to a grinding machine having an oscillating-type work supporting mechanism.

One object of the invention is to provide a simple and thoroughly practical grinding machine for grinding a partial cylindrical surface. Another object is to provide an oscillating type grinding machine for grinding a partial cylindrical internal surface on a work piece. Another object is to provide an oscillating type grinding machine simultaneously to grinding a pair of opposed faces on a work piece. Another object is to provide an oscillatable work support for oscillating a pork piece through a predetermined arcuate path during the grinding of an internal surface.

A further object is to provide an oscillating type grinding machine simultaneously to grinding opposed faces on a work piece and thereafter to grind a partial cylindrical internal face thereon. Another object is to provide a fluid motor for oscillating the work support through a predetermined but adjustable path. Another object is to provide a control mechanism for said fluid to stop said motor with the work support in a predetermined loading position. Another is to provide a control mechanism for the oscillating motor which is controlled or actuated by and in timed relation with the wheel feed control mechanism. Other objects will be in part obvious or in part pointed out hereinafter.

One embodiment plan view of the invention has been illustrated in the drawings in which:

Fig. 3 is a right hand end elevation on an enlarged scale of the work supporting and oscillating mechanism;

Fig. 4 is a fragmentary plan view, on an enlarged scale, of the work supporting and oscillating mechanism and the grinding wheel;

Fig. 5 is a fragmentary sectional view of the work locating and clamping mechanism;

Fig. 6 is a fragmentary view, on an enlarged scale, showing the relationship of the grinding wheels and the work piece during the grinding; and Fig. 7 is a combined electric and hydraulic diagram of the actuating mechanisms and controls thereof.

Figure 1:
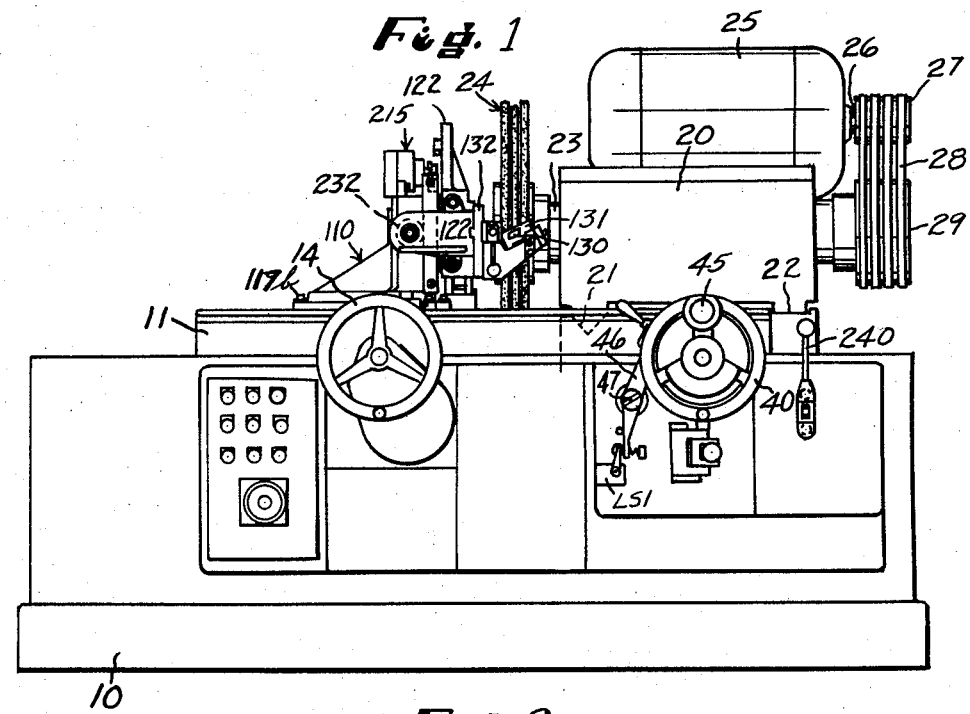
Fig. 1 is a front elevation of a grinding machine embodying the invention.

A grinding machine has been illustrated in the drawings comprising a base 10 which serves as a support for a longitudinally reciprocable table 11. The table 11 is slidably supported on a flat-way 12 and a V-way 13 formed on the upper surface of the base 10. A manually operable table traverse mechanism including a manually operable traverse wheel 14 is provided for imparting a longitudinal traversing and positioning movement to the table 11. This traversing mechanism is an old and well known mechanism such as for example, that shown in the expired U.S. Patent to C. H. Norton No. 762,-838 dated June 14, 1904, to which reference may be had for details of disclosure not contained herein.

A transversely movable wheel slide 20 is slidably mounted on a transversely extending V-way 21 and a flat-way 22 formed on the upper surface of the base 10. The slide 20 is provided with a rotatable wheel spindle 23 which is journalled in suitable bearings (not shown) carried by the slide 20. A grinding wheel 24 is mounted on one end of the spindle 23. A driving mechanism is provided for the spindle 23 comprising an electric motor 25 mounted on the upper surface of the wheel slide 20. The motor 25 is provided with a motor shaft 26 which supports a multiple V-groove pulley 27. The pulley 27 is connected by multiple V-belts 28 with a multiple V-groove pulley 29 mounted on the other end of the wheel spindle 23.

A wheel feeding mechanism is provided for imparting a transverse feeding movement to the wheel slide 20 comprising a rotatable feed screw 30. The feed screw 30 meshes with or engages a rotatable feed nut 31 is supported by a bracket 32 depending from the underside of the wheel slide 20. The feed screw 30 is provided with a reduced cylindrical portion 33 which is slidably keyed within a rotatable sleeve 34. The sleeve 34 is journalled in a bearing 35 which is fixedly mounted relative to the base 10. The other end of the feed screw 30 is rotatably journalled within a slidably mounted sleeve 36. The sleeve 36 is slidably supported within a cylindrical aperture 37. The aperture 37 and sleeve 36 are arranged in axial alignment with the feed screw 30.

Figure 2:
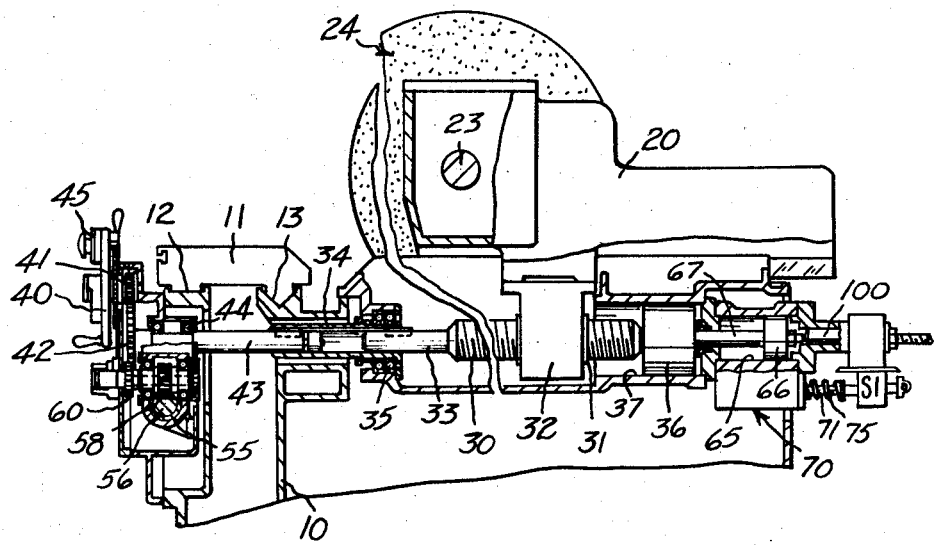
Fig. 2 is a transverse vertical sectional view through the grinding machine wheel feeding mechanism.

A manually operable feeding mechanism is provided comprising a manually operable rotatable feed wheel 40 which is connected to rotate a gear 41. The gear 41 meshes with a gear 42 mounted on the left hand end of a rotatable shaft 43 (Fig. 2). The left hand end of the shaft 43 is journalled in an anti-friction bearing 44. The right hand end of the shaft 43 is slidably keyed within the left hand end of the sleeve 34. It will be readily apparent from the foregoing disclosure that a rotary motion of the feed wheel 40 will be imparted through the mechanism above described to impart a rotary motion to the feed screw 30 so as to cause either a forward or rearward movement of the wheel slide 20 depending upon the direction of rotation of the feed wheel 40.

The feed wheel 40 is provided with the well known micrometer adjusting mechanism 45 having a stop abutment 49 which is arranged to engage a stop surface 48 when the wheel is rotated in a counter-clockwise direction. The stop surface 48 is formed on the upper end of a pivotally mounted feed pawl 46. The pawl 46 is supported by a pivot stud 47 on the front of the base 10 (Figs. 1 and 7). As the abutment 49 approaches the stop surface 48, a cam 50 engages and rocks the pawl 46 in a counter-clockwise direction thereby allowing a normally open limit switch LS1 to close. The closing of switch LS1 serves to energize a solenoid S2 to slow down the infeeding movement of the grinding wheel 24 in a manner to be hereinafter described.

A fluid pressure actuated mechanism is provided for imparting a rotary feeding motion to the feed screw 30 comprising a cylinder 55 (Fig. 7) which contains a slidably mounted piston 56. A rack bar 57 is formed on the upper surface of the piston 56. The rack bar 57 meshes with a gear 58 mounted on a rotatable shaft 59. The shaft 59 is provided with a gear 60 which meshes with the gear 42. When fluid under pressure is passed through a pipe 61 into a cylinder chamber 62 formed at the left hand end of the cylinder 55, the piston 56 will be moved toward the right (Fig. 7) so as to impart a rotary motion to the feed screw 30 to cause an infeeding movement of the wheel slide 20 and the grinding wheel 24. During this movement, fluid within a cylinder chamber 63 is exhausted through a pipe 64.

A fluid pressure operated mechanism is provided for imparting a rapid approaching and receding movement to the wheel slide 20 to cause a rapid positioning movement of the grinding wheel 24. This mechanism comprises a cylinder 65 arranged in axial alignment with the feed screw 30 and the sleeve 36. The cylinder 65 contains a slidably mounted piston 66 which is connected to the right hand end of a piston rod 67. The left hand end of the piston rod 67 is operatively connected to the sleeve 36. The cylinder 65 is provided with cylinder chambers 68 and 69 at the opposite end thereof.

A feed control valve 70 is provided for controlling the admission to and exhaust of fluid from both the feed cylinder 65 and the grinding feed cylinder 55. This valve is a piston type valve comprising a valve stem 71 having a plurality of valve pistons formed integrally therewith so as to form spaced valve chambers 72, 73 and 74. A compression spring 75 is provided for normally holding the valve stem 71 in a right hand position. An electric solenoid S1 is provided which when energized serves to shift valve stem 71 into a left hand end position.

A fluid system is provided for supplying fluid under pressure to reasonable mechanism of machine in this system comprising a motor driven fluid pump 80 which is arranged to be started and stopped by a manually operated switch SW1. The pump 80 draws fluid through a pipe 81 from a reservoir 82 and forces fluid under pressure through a pipe 83 to the mechanisms of the machine. A relief valve 84 is connected with the pipe 83 to facilitate by-passing excess fluid under pressure from the pipe 83 through a pipe 85 into the reservoir 82 so as to maintain a substantially uniform operating pressure in the system.

In the position of the valve 70 (Fig. 7) fluid under pressure from the pipe 83 enters the valve chamber 72 and passes through a passage 90 and through a port 91 into the cylinder chamber 68 to move the piston 66 toward the right into a rearward or inoperative position. Fluid passing through the passage 90 also passes a passage 92, through both a ball check valve 93 and a throttle valve 94, through a passage 95 and through a port 96 into the cylinder chamber 68. During the movement of the piston 66 toward the right, fluid within the cylinder chamber 69 exhausts through a passage 97 into the valve chamber 74 and through an exhaust pipe 98 into the reservoir 82.

When the solenoid S1 is energized to start a grinding feed, the valve stem 71 is shifted into a left hand end position. In this position of the valve, fluid from the pipe 83 entering the valve chamber 74 passes through the passage 97 into the cylinder chamber 69 so as to cause a rapid approaching movement of the piston 66 together with the wheel slide 20 toward the left. During this movement fluid within the cylinder chamber 68 exhausts through the port 91 into the passage 90 and valve chamber 72 and through the exhaust pipe 98. Fluid in cylinder chamber 68 also exhausts through the port 96, the passage 95, and throttle valve 94 into the passage 90. When the piston 66 closes the port 91, the exhausting fluid from the chamber 68 passes through the throttle valve 94 only so as to slow down the rapid movement before the piston 66 engages the left hand end of the cylinder 65.

A dash pot mechanism is provided for cushioning the rapid receding movement of the piston 66 toward the right. This mechanism comprises a slidably mounted dash pot piston 100 (Fig. 7), the left hand end of which is engaged by a reduced end portion 101 of the piston rod 67 when the piston 66 approaches the right hand end of its stroke. During movement of the dash pot piston 100 toward the right, fluid within a dash pot chamber 102 is exhausted through a passage 103, through a throttle valve 104 into the passage 97. By manipulation of the throttle valve 104, the cushioning movement may be varied as desired. A ball check valve 105 is provided so that when fluid under pressure is passed through the passage 97, it may bypass around the throttle valve 104 so as to rapidly refill the dash pot chamber 102 during the rapid approaching movement of the piston 66 and wheel slide 20 toward the left.

Fluid under pressure entering valve chamber 72 also passes through a pipe 208, through a throttle valve 249, through a bypass valve, to be hereinafter described, through the pipe 64 into the cylinder chamber 63 to move the piston 56 toward the left so as to reset the grinding wheel feed mechanism for the next grinding operation. Similarly when the solenoid S1 is energized and the valve stem 71 is moved into a left hand end position, fluid under pressure enters the valve chamber 74, passes through a pipe 209, through the bypass valve 245, through the pipe 61 into the cylinder chamber 62 so as to move the piston 56 toward the right thereby imparting a rotary motion to the feed screw 30 to feed the grinding wheel 24 into the work piece being ground.

The work table 11 serves as a support for a work oscillating mechanism for oscillating a work piece, such as, a jet motor blade. This mechanism comprises a work supporting bracket 110 having a plane face 111 which mates with a corresponding surface on the upper portion of the table 11. The bracket 110 is supported by a pivot stud 112 so that the bracket 110 may be adjusted in a horizontal plane to align the work holder relative to the grinding wheel 24. The bracket 110 is provided with a lug 113 which projects from the front face of the bracket 110 and is arranged in the path of a pair of opposed adjusting screws 115 and 116 (Fig. 4). The adjusting screws 115 and 116 are supported by a bracket 114 which is fixedly mounted on the table 11. It will be readily apparent from the foregoing disclosures that by the manipulating of the screws 115 and 116, the bracket 110 may be adjusted in the horizontal plane about the axis of the pivot stud 112. A plurality of clamping screws 117, 117a, and 117b, pass through clearance holes 118, 118a, and 118b formed in the bracket 110, and are screw threaded into the table 11 to facilitate clamping the bracket 110 in adjusted position.

The bracket 110 is provided with a horizontally extending arm 121 (Fig. 3) which supports a pivoted work carrying arm 122. The work carrying arm 122 is provided with a pivot shaft 123 (Fig. 4) which is journalled in spaced anti-friction bearings 124 and 125. The bearings 124 and 125 are supported within a cylindrical aperture 126 formed in the arm 121.

The jet blade 130 to be ground is mounted within a matrix block 131 (Fig. 5). A soft metal 131a of low melting point is cast within the block 131 to hold the blade in a predetermined position therein for a grinding operation. The arm 122 is provided with a bracket 132 which is clamped by a plurality of clamping screws 133, 134, 135, and 136. The clamping screws pass through an elongated slot formed in the bracket 132 and are screw threaded into the arm 122. By loosening the clamping screws 133, 134, 135, and 136, the bracket 130 may be adjusted relative to the arm 122 after which it may be clamped in an adjusted position. This adjustment serves to vary the position of the blade 130 relative to the axis of the pivot shaft 123.

The bracket 132 is provided with locating surfaces 137 to position the matrix block 131 and the blade 130. A clamping mechanism is provided for clamping the matrix block 131 in position against the locating surfaces 137. This mechanism comprises a V-shaped clamping block 138 which is supported by an eccentric stud 139 (Figs. 4 and 5). The eccentric 139 is formed integrally with a rotatable shaft 140. The shaft 140 is mounted within an eccentric sleeve 141. An actuaitng lever 142 is mounted on the end of the shaft 140 by means of which the clamping block 138 may be actuated to clamp the matrix block 141 in an operative position. As shown in Figure 5, the lever 142, is shown in a clamped position after a grinding operation has been completed, the lever 142 may be swung in a counter-clockwise direction into the broken line position 142a (Fig. 5) to revolve the eccentric stud 134 so as to move the clamping block 138 toward the left (Fig. 5) to unclamp the matrix block after a grinding operation has been completed to facilitate removing the matrix block 131 together with the ground block 130 and matrix block 131 for the next grinding operation.

A plurality of the blocks 131 are provided so as blades 130 are to be ground may be mounted therein a special fixture (not shown) to locate blades for grinding. After a grinding operation has been completed the ground blade may be removed from the matrix block 131 by applying heat to melt the soft metal 131 so that the matrix block 131 may be used again for positioning another blade to be ground.

A fluid pressure mechanism is provided by imparting an oscillating motion to the arm 122 to swing the work piece being ground through a predetermined arcuate path relative to the grinding wheel 24. This mechanism comprises a cylinder 160 which is pivotally connected by a stud 161 with the arm 122. The cylinder 160 contains a slidably mounted piston 162 which is connected to the upper end of a piston rod 163. The lower end of the piston rod 163 is pivotally connected by a stud 164 (Figs. 3 and 7) with a downwardly extending arm 165 depending from the bracket 110.

The arm 122 is normally held in an uppermost position, as shown in Fig. 7. When fluid under pressure is passed through a pipe 170, through a ball check valve 171 and a throttle valve 172, through a pipe 173 into a cylinder chamber 174, the cylinder 160 is moved downwardly so as to impart a counter-clockwise swing movement to the arm 122. During this movement, fluid within a cylinder chamber 175 exhausts through a pipe 176, through a throttle valve 177, and through a pipe 178. A ball check valve 179 is connected to by-pass fluid around the throttle valve 177 when fluid under pressure is passed through the pipe 178.

A shuttle-type valve 185 is provided for controlling the admission to an exhaust of fluid from the pipes 170 and 178 and the cylinder 160. The valve 185 contains a slidably mounted valve member 186 which is provided with a plurality of integral spaced valve pistons to form a plurality of space valve chambers 187, 188, and 189. The valve member 186 is provided with a central passage 190 which interconnects the valve chamber 187 with the valve chamber 189. A pipe 191 is connected to the left hand end of the valve 185 and a pipe 192 is connected to the right hand end of the valve 185. An exhaust pipe 193 is provided for exhausting fluid from the valve 185 into the reservoir 82. When fluid under pressure is passed through the pipe 191, the valve member 186 is moved toward the right (Fig. 7). Similarly when fluid under pressure is passed through the pipe 192, the valve member 186 is moved into a left hand end position.

A second shuttle-type valve 200 is provided for conveying fluid under pressure to the pipe 191 so as to shift the valve 185 toward the right (Fig. 7). This valve comprises a slidably mounted valve member 201 having a plurality of spaced integral valve pistons which form a plurality of spaced valve chambers 202, 203, and 204. The valve member 201 is provided with a central passage 205 which interconnects the valve chamber 202 with the valve chamber 204. A pair of exhaust pipes 206, and 207 are provided to exhaust fluid from the valve 200 into the reservoir 82. A pair of pipes 208 and 209 are connected between the feed control valve 70 and the opposite ends of the shuttle valve 200 so that the valve 200 will be actuated by and in timed relation with the feed control valve 70. In the position, as shown in Fig. 7, fluid under pressure entering the valve chamber 72 passes through the pipe 208 into a chamber formed at the left hand end of the valve 200 so as to shift the valve member 201 into a right hand end position. During this movement of the valve member 201 fluid within an end chamber formed at the right hand end of the valve 200 exhausts through the pipe 209 into the valve chamber 72 and exhausts through the pipe 97 into the reservoir 82.

A reversing valve 215 is provided to facilitate controlling the oscillating movement of the arm 122 and the work piece 130. The valve 215 is preferably a rotary-type valve having a valve rotor 216. The valve 215 is provided with an exhaust pipe 217 for an exhausting fluid into the reservoir 82. A pipe 218 is connected between the reversing valve 215 and the shuttle-type valve 200.

The reversing valve 215 is provided with an actuating lever 220 which is arranged to turn the valve rotor 216. The lever 220 is provided with a pair of staggered offset projections 221 and 222 (Figs. 3 and 7) which are arranged in the path of adjustable dogs 223 and 224, respectively. The dogs 223 and 224 are supported by clamping bolts which slide in an arcuate slot 225 (Fig. 3).

It will be readily apparent from the foregoing that the shuttle valve 200 is actuated by and in timed relation with the feed control valve 70. The slidable valve member 201 of the valve 200 remains in a left hand end position during the entire infeeding movement of the grinding wheels 24. The valve 200 serves to control the passage of fluid under pressure to and the exhaust of fluid from the left hand end of the valve 185. The reversing valve 215 serves to control the passage of fluid under pressure through the valve 200 to the left hand end of the valve 185 to shift it toward the right, or directly to the right hand end of the valve 185. The valves 185, 200, and 215 are connected in this manner so that when the timer T1 times out to deenergize the solenoid S1 to cause a rearward movement of the wheel slide 20 and the grinding wheels 24 to an inoperative position after a grinding operation, the arm 122 is stopped in an uppermost or loading position.

The horizontal arm 121 is provided with a pair of opposed guide ways 230 and 231 to facilitate guiding the outer end of the swing arm 122. The arm 122 is provided with a guide roller 232 which is arranged to engage the slide way 230. The arm 122 is also provided with a pair of spaced guide rollers 233 and 234 which are arranged to engage the slide way 231. The guide rollers 232, 233, and 234 are all supported on anti-friction bearings carried by studs 232a, 233a, and 234a, all of which are provided with an eccentric adjustment to facilitate taking up lost motion between the outer end of the arm 122 and the slide ways 230 and 231.

A main control lever 240 is pivotally supported on the front of the machine base 10. As shown diagrammatically in Fig. 7, the lever 240 is arranged so that when moved in a counter-clockwise direction, it will close a normally open start switch SW6 to energize a time relay T1. The energizing of the timer T1 serves to close the contactors LC1 and RC1. The closing of the contacts LC1 serves to set up a holding circuit to maintain the timer T1 energized after the start switch SW6 opens. The closing of the contactors RC1 serves to energize the solenoid S1 so as to shift the slidably mounted valve member 71 of the feed control valve 70 toward the left to start a grinding cycle.

A by-pass valve 245 is provided to render the feed piston 56 inoperative so as to facilitate a manual actuation of the feed mechanism in setting up the machine. The by-pass valve 245 is normally held in a left hand end position by means of a compression spring 246. A manually operable valve 247 is connected between the pipe 83 and the left hand end of the by-pass valve 245. When it is desired to render the feed piston 56 inoperative, the valve 247 is opened to admit fluid under pressure to the left hand end of the by-pass valve 245 so as to shift it into a right hand end position thereby cutting off the admission to an exhaust of fluid from the valve 245.

The by-pass valve 245 is a piston type valve having a pair of spaced valve chambers 257 and 258 which are arranged when in a by-pass position to allow fluid to pass directly between the chambers 62 and 63 of the cylinder 55, through the valve chamber 257 so that the feed wheel 40 may be actuated without the necessity of overcoming fluid under pressure.

A solenoid valve 248 is provided to facilitate automatically reducing the rate of movement of the piston 56 to a finish grinding rate before the work piece has been ground to a final size. The solenoid valve 248 is normally held in a left hand end position by means of a compression spring 255. The pipe 208 is connected to a throttle valve 249 which is in turn connected to a pipe 250. The pipe 209 is connected to the valve 245 to supply fluid under pressure to the end chamber 62 to move the feed piston 56 toward the right. During the initial feeding movement of the piston 56 toward the right, fluid within the cylinder chamber 63 exhausts through the pipe 64, through the valve chamber 258 and through the pipe 250, through the throttle valve 249 and the pipe 208. During this initial movement of the piston 56 toward the right, fluid exhausting from the cylinder chamber 63 may also pass from the pipe 250 through a throttle valve 254, through a pipe 253, through a valve chamber 255 in the solenoid valve 248 and through the pipe 252 into the exhaust pipe 208.

When the side surfaces 130a and 130c of the workpiece 130 have been ground to a desired and predetermined extent, the cam 50 on the feed wheel rocks the feed pawl 46 in a counter-clockwise direction so as to allow the normally open limit switch LS1 to close thereby energizing a solenoid S2 to shift to valve 248 toward the right so as to cut-off the exhaust of fluid between the pipe 253 and the pipe 251. After valve 248 is shifted into this position all of the fluid exhausting from the cylinder chamber 63 must pass through the throttle valve 249 which controls the rate of infeed of the grinding wheels while grinding the partial internal arcuate surface 130b (Fig. 6). It will be readily apparent from the foregoing disclosure that by the manipulation of the throttle valves 254 and 249, the initial infeeding movement of the grinding wheels 24 and the final infeeding movement thereof may be adjusted as desired. A manually operable switch SW3 is provided to facilitate rendering the solenoid valve 248 inoperative when desired. When the switch SW3 is opened, fluid exhausting from the cylinder chamber 63 passes through both the throttle valve 249 and the throttle valve 254.

The operation of the grinding machine will be readily apparent from the foregoing disclosure. A blade 130 to be ground, mounted in the matrix block 131, is clamped in position on the arm 122. The SW1 is closed to start the motor driven fluid pump 80, and the switch SW2 is closed to start the grinding wheel driving motor 25. When it is desired to start the grinding cycle, the cycle control lever 240 is rocked in a counter-clockwise direction (Fig. 7) momentarily to close the start switch SW6. The closing of switch SW6 energizes the timer T1 and closes the contactors LC1 and RC1. The closing of the contacts LC1 sets up a holding circuit to maintain the timer T1 energized for a predetermined time interval until it times-out. The closing of the contacts RC1 serves to close a circuit to energize the solenoid S1 so as to shift the feed control valve 70 toward the left to admit fluid under pressure to the cylinder chamber 69 thereby causing a rapid approaching movement of the wheel slide 20 and grinding wheels 24 toward the workpiece to be ground. At the same time fluid under pressure is passed through the pipe 209, through the valve 245 into the cylinder chamber 62 to start the piston 56 moving toward the right so as to cause a grinding feed at a rate controlled by the setting of the throttle valves 254 and 249. During this movement, the grinding wheels, 24 and 24b, grind the plane side faces 130a and 130c, respectively, on the opposite sides of the workpiece.

As the grinding wheel 24a approaches the partial internal surface 130b, the feed pawl 46 is rocked in a counter-clockwise direction so as to allow the limit switch LS1 to close thereby energizing the solenoid S2 so as to shift the valve 248 into a right hand end position. In this position of the valve 248, the exhaust of fluid through the throttle valve 254 is cut off and all fluid exhausting from the cylinder chamber 63 exhausts through the throttle valve 249. The throttle valve 249 serves to control the rate of infeed during the grinding of the partial internal cylindrical face 130b.

As soon as the feed control valve 70 is shifted into a left hand end position to start the rapid approaching movement of the grinding wheel 24 relative to the workpiece 130, fluid under pressure is also passed through the pipe 209 and through the pipe 218 to start the oscillation of the work supporting arm 220. The arm 220 oscillates through a stroke as governed by the setting of the dogs 223 and 224.

The grinding operation on the partial cylindrical internal face 130b continues until the timer T1 times out at time out, the contacts LC1 and RC1 open. The opening of the contacts LC1 breaks the holding circuit and allows the timer T1 automatically to reset. The opening of contacts RC1 serves to deenergize the solenoid S1 thereby releasing the compression of the spring 75 which returns the valve 70 into the position illustrated in Fig. 7. When the valve 70 reaches this position fluid under pressure is passed into the cylinder chamber 68 to cause a rapid movement of the piston 66 toward the right and also passes into the cylinder chambers 62 to move the piston 56 toward the right thereby withdrawing the wheel slide 20 and the grinding wheels 24 to an inoperative position. At the same time the piston 56 is returned to a left hand end position, as illustrated in Fig. 7, so as to reset the grinding feed mechanism.

At the same time the valve 70 is shifted to a right hand end position, the valve mechanism previously described serves to stop the work carrying arm 122 in an uppermost loading position. The ground workpiece 130 together with its supporting matrix block 131 may then be removed and a new workpiece 130 to be ground supported in another matrix block may be clamped in position on the arm 122 for the next grinding operation.

It will thus be seen that there has been provided by this invention apparatus in which the various objects hereinabove set forth together with many thoroughly practical advantages are successfully achieved. As many possible embodiments may be made of the invention and as many changes might be made in the embodiment above set forth, which is to be understood that all matter hereinbefore set forth are shown in the accompanying drawings, is to be interpreted as illustrative and not in a limiting sense.

I claim:

1. In a grinding machine having a transversely movable rotatable grinding wheel, said grinding wheel being arranged to grind a pair of opposed parallel faces and a partial internal cylindrical face on a work piece, an oscillatable work support, a pivot for said support which is arranged to oscillate said work support about an axis parallel to the axis of the grinding wheel and aligned with the axis of said internal face to be ground, and means simultaneously to cause a relative transverse feeding movement between the grinding wheel and the work piece so as to first grind the opposed faces and thereafter to grind the partial internal cylindrical surface.

2. In a grinding machine having a base, a transversely movable wheel slide thereon, a rotatable grinding wheel on said slide, a feeding mechanism including a fluid motor to impart a transverse feeding movement to said slide, an oscillatable arm on said base, a pivot shaft for said arm which is arranged with its axis parallel to the axis of the grinding wheel, a work support on said arm arranged a predetermined distance from said shaft to facilitate grinding a partial internal cylindrical surface of predetermined radius, a second fluid motor operatively connected to operate said arm to an adjustable stroke, a feed control valve operatively connected to control both of said fluid motors, a control valve mechanism to control said second fluid motor and operative connections between said feed control valve and the control valve mechanism to impart an oscillating movement to said arm by an in-timed relation with the infeeding movement of the grinding wheel.

3. In a grinding machine, as claimed in claim 2, in which an electric timer is provided to control the duration of the grinding cycle, said timer serving at time-out to move the grinding wheel rearwardly to an inoperative position and to stop oscillation of the work supporting arm, said control valve mechanism being arranged and operatively connected to stop said arm in an uppermost or loading position.

4. In a grinding machine, as claimed in claim 2, in which said control valve mechanism includes a reversing valve operatively connected to control said second fluid motor, and means including adjustable dogs on said arm to actuate reversing valve so as to control the oscillatory stroke of said arm, said valve mechanism being arranged to stop said arm in a loading position when the grinding wheel moves rearwardly to an inoperative position after a grinding operation.

5. In a grinding machine, as claimed in claim 2, in which a rotatable shaft is arranged parallel to the axis of the grinding wheel is provided to pivotally support one end of the work supporting arm, a work supporting and locating clamp adjacent to the other end of said arm to facilitate supporting a work piece to be ground a predetermined distance from the shaft to facilitate grinding a partial internal cylindrical surface of a predetermined radius.

6. In a grinding machine as claimed in claim 2, in which the grinding wheel comprises a plurality of spaced grinding wheels, a pair of spaced operative plane faces thereon arranged to grind a pair of spaced parallel plane side faces on a work piece and a peripheral operative face on said grinding wheel thereafter to grind a partial internal cylindrical surface on the work piece to be ground.

7. In a grinding machine, as claimed in claim 2, in which the grinding wheel is provided with a pair of spaced operative plane faces simultaneously to grind a pair of spaced parallel plane side faces and a peripheral operative face on said grinding wheel thereafter to grind a partial internal cylindrical surface adjacent to one end of a work piece.

References Cited in the file of this patent

UNITED STATES PATENTS

| | | |
|---|---|---|
| 2,151,666 | Silven | Mar. 21, 1939 |
| 2,322,727 | Cole | June 22, 1943 |
| 2,425,234 | Erwin et al. | Aug. 5, 1947 |